United States Patent
Tsuge

(10) Patent No.: US 7,552,902 B2
(45) Date of Patent: Jun. 30, 2009

(54) MOUNTING STRUCTURE FOR SUPPRESSING VIBRATION

(75) Inventor: Shigeto Tsuge, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/952,263

(22) Filed: Dec. 7, 2007

(65) Prior Publication Data
US 2008/0179488 A1 Jul. 31, 2008

(30) Foreign Application Priority Data
Jan. 30, 2007 (JP) .............................. 2007-019341

(51) Int. Cl.
*F16M 1/00* (2006.01)
(52) U.S. Cl. ..................... 248/638; 411/107; 411/999
(58) Field of Classification Search ................ 248/638, 248/674, 678, 680; 411/107, 999
See application file for complete search history.

(56) References Cited

U.S. PATENT DOCUMENTS

| | | | | |
|---|---|---|---|---|
| 6,059,503 A | * | 5/2000 | Johnson | .................. 411/353 |
| 6,162,038 A | * | 12/2000 | Cefaretti | .................. 425/186 |
| 6,227,784 B1 | * | 5/2001 | Antoine et al. | .............. 411/369 |
| 6,345,966 B1 | * | 2/2002 | Hahn et al. | ................. 418/55.1 |
| 2004/0213644 A1 | * | 10/2004 | Clark et al. | ................. 411/107 |

FOREIGN PATENT DOCUMENTS

| | | |
|---|---|---|
| JP | 64-55380 | 4/1989 |
| JP | 7-41160 | 7/1995 |

* cited by examiner

*Primary Examiner*—Ramon O Ramirez
(74) *Attorney, Agent, or Firm*—Nixon & Vanderhye, PC

(57) ABSTRACT

An object such as an electromagnetic valve is resiliently mounted (or in a floating manner) on a mounting base such as an intake manifold of an internal combustion engine. A valve port of the electromagnetic valve is connected to a connecting hole of the intake manifold via an O-ring, and a stay connected to the electromagnetic valve is coupled to a bolt via a resilient member such as a grommet. The bolt is rotated to be fastened to the intake manifold by screwing. A rod portion of the bolt is inserted into a hole of the grommet. Projections and depressions such as grooves extending along the rotational direction of the rod portion are formed on the inner surface of the grommet hole to reduce a contacting area and abrasion force between the grommet and the rod portion. In this manner, deformation of the grommet caused by rotation of the rod portion is suppressed.

6 Claims, 2 Drawing Sheets

MOUNTING STRUCTURE FOR SUPPRESSING VIBRATION

CROSS-REFERENCE TO RELATED APPLICATION

This application is based upon and claims benefit of priority of Japanese Patent Application No. 2007-19341 filed on Jan. 30, 2007% the content of which is incorporated herein by reference.

BACKGROUND OF THE INVENTION

1. Field of the Invention

The present invention relates to a structure for mounting an object on a mounting base, in which vibration of the object is suppressed.

2. Description of Related Art

A structure for mounting an object on a mounting structure with a resilient member disposed therebetween to suppress vibration of the object has been known hitherto. For example, JP-U-64-55380 and JP-U-7-41160 disclose a structure for mounting an electromagnetic valve for controlling an amount of purge gas on an intake manifold of an automotive engine. A rubber grommet is supported on a stay connected to the electromagnetic valve, and a bolt is inserted into a hole of the grommet and a tip of the bolt is screwed into the intake manifold. In this manner, the electromagnetic valve is resiliently mounted on the intake manifold to thereby suppress vibration of the electromagnetic valve.

In the conventional mounting structure, a metallic sleeve is disposed in a hole of the grommet into which a threaded portion of the bolt is inserted. The metallic sleeve is used to prevent direct contact between the hole of the grommet and the threaded portion of the bolt while allowing the grommet to be properly compressed. In the conventional structure, however, the number of parts constituting the mounting structure increases by using the metallic sleeve. Further, a thickness of the grommet in the radial direction has to be reduced due to presence of the metallic sleeve because a mounting space on the intake manifold is limited. The thinner grommet reduces effectiveness of the grommet in suppressing vibration.

On the other hand, when the electromagnetic valve is heavy or its axial length is long, it is highly possible that the electromagnetic valve may be slanted by vibration force. If the grommet for resiliently mounting the electromagnetic valve is positioned close to the intake manifold on which the electromagnetic valve is mounted, a valve port of the electromagnetic valve contacts an inside wall of the mounting hole, and operating noises of the valve will be propagated to the intake manifold.

In the mounting structures shown in JP-U-64-55380 and JP-U-7-41160 mentioned above, it is proposed to place a supporting position (a position where a bolt is screwed into the mounting base) as closer as possible to a gravity center of the electromagnetic valve. However, this makes a shape of the intake manifold complex. To cope with this problem, it may be conceived to place the supporting position apart from the mounting base by using a longer bolt and to eliminate a metallic sleeve disposed in the grommet hole. In this structure, however, a rod portion of the bolt, where a thread is not formed, directly contacts an inner wall of the grommet hole, and the grommet is deformed by abrasion force generated when the bolt is screwed into the intake manifold. If the grommet is too much deformed, the grommet will be damaged by cracks or the like, and its durability will be decreased. If an amount of compression of the grommet is reduced to avoid cracks, the electromagnetic valve may not be correctly held on the intake manifold.

SUMMARY OF THE INVENTION

The present invention has been made in view of the above-mentioned problem, and an object of the present invention is to provide an improved mounting structure for suppressing vibration while avoiding increase in the number of parts used in the structure.

An object such as an electromagnetic valve for controlling an amount of evaporated gas purged from a canister is mounted on a mounting base such as an intake manifold of an internal combustion engine. The electromagnetic valve has to be resiliently (or in a floating manner) mounted on the intake manifold.

A valve port of the electromagnetic valve is coupled to a connecting hole of the intake manifold via an O-ring. A resilient member such as a grommet made of resin is coupled to a stay connected to a main body of the electromagnetic valve. A bolt having a male screw at one end and a bolt head at the other end is inserted into a grommet hole so that a rod portion between the male screw and the bolt head contacts an inner surface of the grommet hole. The male screw is fastened to a female screw formed in the intake manifold to thereby resiliently mount the electromagnetic valve on the intake manifold. The grommet disposed between the bolt and the electromagnetic valve suppresses propagation of vibration between the intake manifold and the electromagnetic valve.

Depressions and projections are formed on the inner surface of the grommet hole to reduce a contacting area between the rod portion of the bolt and the grommet hole and to reduce rotational torque transfer from the rod portion to the grommet hole. The rotational torque is generated when the bolt is rotated to fasten the male screw to the female screw formed in the intake manifold. Preferably, the depressions and projections are formed in a shape of plural grooves extending along the rotational direction of the bolt. Since abrasion force between the grommet hole and the rod portion is alleviated by the depressions and projections such as the grooves, deformation of the grommet caused by the rotation of the bolt is suppressed without using a sleeve disposed inside the grommet hole.

Preferably, the grommet is positioned a predetermined distance apart from the intake manifold, so that the electromagnetic valve stably maintains an upright mounting posture, withstanding vibration of the engine. Another stay may be additional connected to the electromagnetic valve at a position close to the intake manifold, and the stay may be resiliently coupled to the bolt in a similar manner. Other objects and features of the present invention will become more readily apparent from a better understanding of the preferred embodiment described below with reference to the following drawings.

DETAILED DESCRIPTION OF THE PREFERRED EMBODIMENTS

Figure 1:
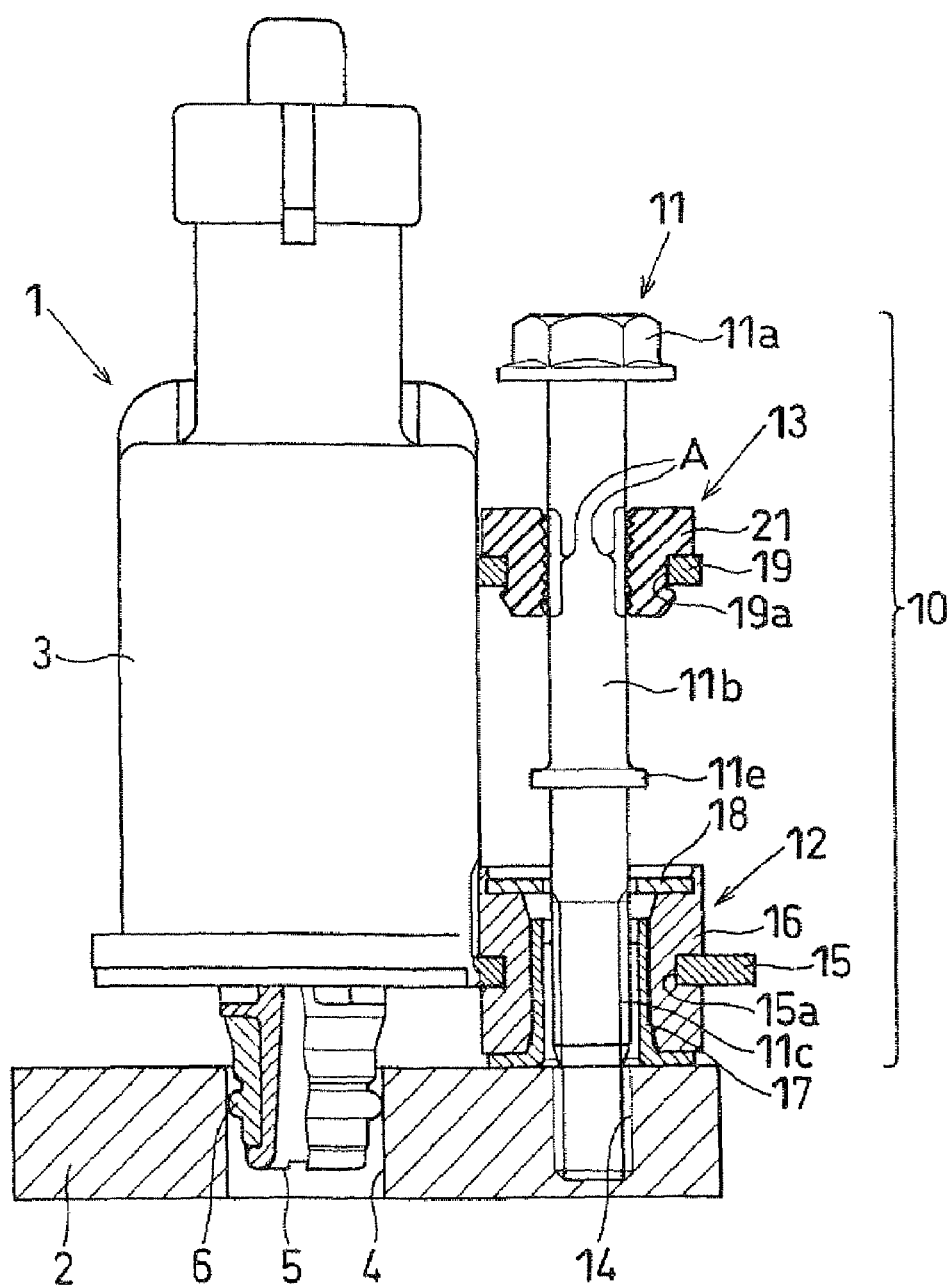
FIG. 1 is a cross-sectional view showing a mounting structure for suppressing vibration according to the present invention.

A preferred embodiment of the present invention will be described with reference to accompanying drawings. In this embodiment, an electromagnetic valve 1 is resiliently mounted on an intake manifold 2 of an automotive engine. The electromagnetic valve 1 controls an amount of evaporated fuel absorbed in a canister and purged to an intake pipe in which vacuum is generated. The electromagnetic valve 1 opens or closes a fuel passage and controls an opening degree of the passage.

The electromagnetic valve 1 includes a main body in which an electromagnetic actuator is disposed and a valve port 5 inserted into a connecting hole 4 of the intake manifold 2. An O-ring 6 is disposed between the valve port 5 and the connecting hole 4 to provide a sealing therebetween. The O-ring 6 prevent the valve port 5 from directly contacting the connecting hole 4. The electromagnetic valve 1 is mounted on the intake manifold by a mounting structure 10 having a function of suppressing vibration.

The mounting structure 10 includes a bolt 11a first supporting portion 12, and a second supporting portion 13. The bolt 11 is inserted into the first supporting portion 12 and the second supporting portion 13, both resiliently connected to the electromagnetic valve 1, and is connected to the intake manifold 2 by screwing. The first supporting portion 12 is located close to the intake manifold 2, while the second supporting portion 13 is located a certain distance apart from the intake manifold 2.

The bolt 11 includes a bolt head 11a, an elongated rod portion 11b having a round cross-section, and a male screw 11c formed at an end of the bolt 11. The male screw 11c is connected to a female screw 14 formed in the intake manifold 2. The bolt 11 also includes a flange 11e formed on the rod portion 11b.

The first supporting portion 12 is coupled to a first stay 15 connected to the main body 3 of the electromagnetic valve 1. The first supporting portion 12 is composed of a rubber bushing 16, a metallic sleeve 17 and a metallic washer 18. The rubber bushing 16 is made of a resilient resin (such as EPEM) and formed in a cylindrical shape. The rubber bushing 16 is coupled to a hole of the first stay 15, which is formed in a round shape, C-shape, U-shape or the like. A groove to be coupled to the hole 15a is formed on the outer periphery of the cylindrical rubber bushing 16.

The metallic sleeve 17 includes a cylindrical portion inserted into an inner hole of the rubber bushing 16 and a bottom flange contacting an upper surface of the intake manifold 2. The rubber bushing 16 is properly compressed between the metallic sleeve 17 and the hole 15a of the first stay 15. The metallic washer 18 is formed in a round disc and placed on an upper end of the rubber bushing 16. When the bolt 11 is screwed in the intake manifold 2, the flange 11e formed on the rod portion of the bolt 11 pushes down the metallic washer 18, and thereby the rubber bushing 16 is properly compressed in its axial direction.

The second supporting portion 13 is solely composed of a grommet 21 made of a resilient resin material (such as EPEM). The grommet 21 is coupled to a second stay 19 connected to the main body 3 of the electromagnetic valve 1 at a position a certain distance apart from the intake manifold 2. The grommet 21 is coupled to a hole 19a of the second stay 19, which is formed in a round shape, a C-shape, a U-shape or the like. A groove to be coupled to the hole 19a of the second stay 19 is formed on an outer periphery of the grommet 21.

The rod portion 11b of the bolt 11 is inserted into a hole of the grommet 21. The inner diameter of the grommet hole is made a little smaller than the outer diameter of the rod portion 11b, so that the grommet 21 is properly compressed in the radial direction. Since the rod portion 11b is forcibly inserted into the grommet hole, abrasion force is generated between the grommet hole and the rod portion 11b when the bolt 11 rotated to crew the bold 11 into the intake manifold 2.

Figure 2:
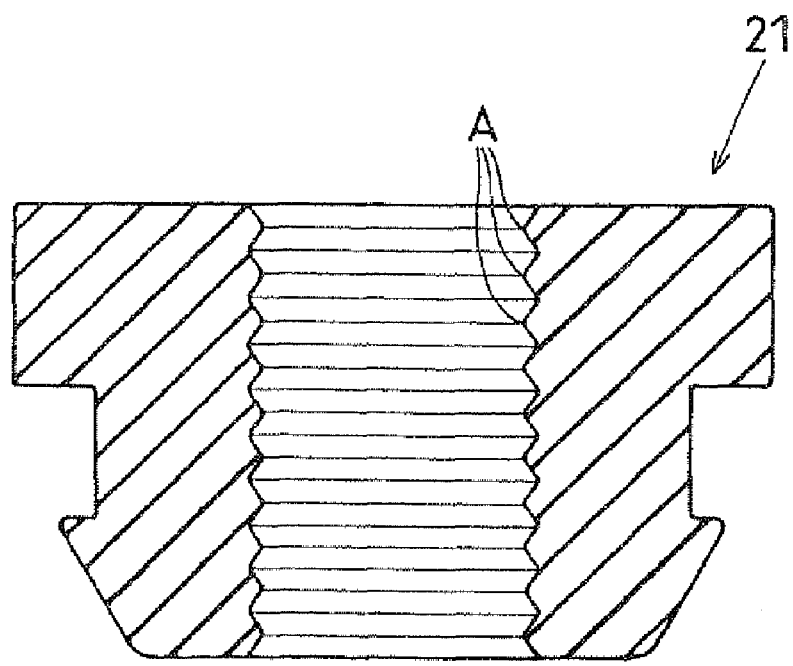
FIG. 2 is a cross-sectional view showing a grommet made of a resilient material, the grommet being used in the mounting structure shown in FIG. 1.

On an inner surface of the grommet hole, depressions and projections "A" are formed to reduce an area contacting the rod portion 11b of the bolt 11. The depressions and projections "A" are formed as plural grooves extending in a rotational direction of the rod portion 11b. As shown in FIG. 2, the grooves have triangular sharp valleys and peaks. However, the valleys and peaks may be formed to have a curved contour. Alternatively, the grooves may be made in a form of female screw having a helical trail. In this embodiment, the bolt head 11a does not contact the grommet 21 when the bolt 11 is connected to the intake manifold 2 by screwing. It is possible, however, to set a length of the bolt so that the bolt head 11a contacts the grommet 21 and compresses the grommet 21 in the axial direction. In this case, it is preferable to form circular grooves on the grommet 21 or to place a metallic washer between the grommet 21 and the bolt head 11a to reduce abrasion force therebetween.

Since the depressions and projections "A" are formed on the inner surface of the hole of the grommet 21, the abrasion force generated according to rotation of the bolt 11 between the grommet 21 and the rod portion 11b of the bolt 11 is reduced. Therefore, the grommet 21 is prevented from being deformed by the abrasion force. Deterioration of the grommet 21 due to damages such as cracks caused by its deformation is avoided. Since the deformation of the grommet 21 is prevented by the depressions and projections "A", a compression ratio of the grommet 21 can be made higher to thereby decrease possibility that a mounting posture of the electromagnetic valve 1 changes due to an external force applied thereto.

Since the deformation of the grommet 21 is prevented by forming the depressions and projections on the inner surface of the grommet hole, it is not necessary to insert a sleeve into the grommet hole, thereby reducing the manufacturing cost of the mounting structure 10. Further, a thickness of the grommet 21 in the radial direction of the bolt 11 is not sacrificed by the sleeve. Accordingly, vibration-absorbing ability of the grommet 21 is enhanced. Since the depressions and projections "A" are formed in the shape of grooves extending along a rotational direction of the rod portion 11b of the shaft 11, the rod portion 11b makes a line contact with the grommet hole, and the projected portions are not slanted in the rotational direction of the rod portion 11b. Therefore, an amount of deformation of the grommet 21 can be suppressed to a minimal amount.

The present invention is not limited to the embodiment described above, but it may be variously modified. For example, an object to be mounted on a mounting base is not limited to the electromagnetic valves, but other objects can be similarly mounted. The mounting structure of the present invention is applicable to any object that is resiliently mounted (may be referred to as floating-mount) on a mounting base. Similarly, the mounting base is not limited to the intake manifold 2. In the case where the compressive force applied to the grommet 21 is not high, the grooves formed along the rotational direction may be replaced with plural projections or grooves extending in a direction different from the rotational direction. Though the present invention is applied to the second supporting portion 13, it may be applied also to the first supporting portion 12. In the case where the object to be resiliently mounted is light-weight or vibration applied to the object is low, the first supporting portion 12 used in the embodiment may be eliminated. Alternatively, the present invention may be applied to the first supporting portion 12, shortening the bolt 11 and eliminating the second supporting member 13.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A structure for mounting an object on a mounting base, comprising:
    a bolt having a male screw to be fastened to a female screw formed in the mounting base and a rod portion;
    a first resilient member disposed between the object and the bolt at a bottom portion of the object; and
    a second resilient member having a hole into which the rod portion of the bolt is inserted, the second resilient member being disposed between the object and the bolt at an upper portion of the object to suppress vibration propagation between the object and the bolt, wherein:
    depressions and projections are formed on an inner surface of the hole of the second resilient member to reduce an area contacting the rod portion to thereby reduce abrasion force generated between the hole and the rod portion when the bolt is rotated to be fastened to the mounting base; and
    an inner diameter of the hole of the second resilient member is smaller than an outer diameter of the rod portion so that the grommet is compressed in the radial direction of the hole when the rod portion is inserted into the hole.

2. The structure as in claim 1, wherein the depressions and projections are formed as grooves extending along a rotational direction of the rod portion.

3. The structure as in claim 1, wherein: the male screw is formed at one end of the bolt, a bolt head is formed at the other end and the rod portion is formed between the bolt head and the male screw; and the resilient member is a grommet made of resin.

4. The structure as in claim 3, wherein the grommet is positioned a predetermined distance apart from the mounting base.

5. The structure as in claim 1, wherein: the mounting base is an intake manifold forming an intake air passage of an internal combustion engine; and the object to be mounted is an electromagnetic valve for controlling amount of evaporated gas purged from a canister.

6. The structure as in claim 1, wherein the resilient member is resiliently coupled to a stay connected to the object to be mounted on the mounting base.

* * * * *